United States Patent [19]

McKee et al.

[11] Patent Number: 5,847,054

[45] Date of Patent: Dec. 8, 1998

[54] POLYMER PARTICLES AND THEIR PREPARATION

[75] Inventors: Graham Edmund McKee, Neustadt, Germany; Binnur Gunesin, Neuchatel, Switzerland; Anton Ticktin, Mannheim, Germany

[73] Assignee: BASF Aktiengesellschaft, Ludwigshafen, Germany

[21] Appl. No.: 679,621

[22] Filed: Jul. 12, 1996

(Under 37 CFR 1.47)

[30] Foreign Application Priority Data

Aug. 4, 1995 [DE] Germany .................. 195 28 717.7

[51] Int. Cl.⁶ .................. C08F 257/02; C08L 51/00
[52] U.S. Cl. .................. 525/314; 525/86; 525/242; 525/902; 428/407
[58] Field of Search ................. 525/316, 193, 525/232, 243; 925/86, 314, 902, 242; 428/407

[56] References Cited

U.S. PATENT DOCUMENTS

| | | |
|---|---|---|
| 3,972,963 | 8/1976 | Schwab . |
| 4,393,169 | 7/1983 | Moriwaki ................. 525/67 |
| 4,460,742 | 7/1984 | Kishida ................. 525/67 |
| 4,617,329 | 10/1986 | Weese ................. 525/67 |
| 4,677,162 | 6/1987 | Grigo ................. 525/67 |
| 4,829,135 | 5/1989 | Gunesin ................. 526/173 |
| 4,871,814 | 10/1989 | Gunesin et al. ................. 525/314 |
| 4,942,209 | 7/1990 | Gunesin et al. ................. 526/173 |
| 4,985,505 | 1/1991 | Gunesin et al. ................. 525/250 |
| 5,334,657 | 8/1994 | Swartzmiller et al. ................. 525/71 |
| 5,344,869 | 9/1994 | Seelert et al. ................. 524/505 |
| 5,532,315 | 7/1996 | Bonekamp et al. ................. 525/71 |

FOREIGN PATENT DOCUMENTS 44-9391   4/1969   Japan .

*Primary Examiner*—David Buttner
*Attorney, Agent, or Firm*—Keil & Weinkauf

[57] ABSTRACT

Polymer particles are prepared by polymerizing at least one monomer in the presence of block copolymers or graft copolymers in an organic dispersant which does not dissolve the polymer to be prepared, and subjecting at least one monomer to free radical polymerization in the presence of the polymer obtained therefrom.

11 Claims, No Drawings

POLYMER PARTICLES AND THEIR PREPARATION

The present invention relates to polymer particles and to a process for their preparation. The present invention relates in particular to polymer particles for dulling polymers and increasing their impact strength.

It is known that other polymers can be incorporated into the matrix of the main polymer in order to dull polymers such as thermoplastics and thermosetting plastics or to increase their impact strength. These admixed polymers may also change other physical properties of the polymers.

U.S. Pat. No. 4,871,814 describes the preparation of linear high molecular weight block copolymers of styrene and butadiene which have at least 5 blocks. The object is to achieve high optical transparency and other desirable physical properties. It is proposed to carry out an anionic polymerization where the dispersant is not to be a solvent for the polymer to be prepared.

A process for the preparation of polymer particles having a narrow distribution of particle sizes is proposed by U.S. Pat. No. 4,942,209. This too describes an anionic polymerization process in which the dispersant once again is not to be a solvent for the polymer to be prepared.

U.S. Pat. No. 4,985,505 describes the preparation of conjugated diene polymers, in particular of block copolymers of polymerized styrene or alkylstyrene units and conjugated dienes, such as butadiene, by polymerization under superatmospheric pressure. The dispersant proposed is propane or butane, in which the polymer to be prepared is scarcely soluble.

When added to thermoplastics or thermosetting plastics, the stated polymers frequently exhibit incompatibility with the matrix of the main polymer. As a result, the desired toughness and dullness of the plastic cannot be achieved.

It is an object of the present invention to provide polymer particles which, when added to polymers, increase the dullness and impact strength of polymers, and a process for their preparation.

We have found that this object is achieved by the process for the preparation of polymer particles which is described in the claims. In said process, a) at least one monomer (a) is polymerized in the presence of block copolymers and/or graft copolymers in an organic dispersant which does not dissolve the polymer to be prepared, and b) at least one monomer (b) is subjected to free radical polymerization in the presence of the polymer obtained therefrom, the polymerization in stage (b) being carried out once or several times.

Preferred embodiments of this process are defined in the subclaims.

Polymerization stage a)

Suitable dispersants are all organic liquid compounds which do not dissolve the polymer prepared in step a). Hydrocarbons, in particular $C_3$–$C_{10}$-alkanes, preferably $C_3$–$C_8$-alkanes, eg. propane, butane, isobutane, pentane, isopentane, hexane, heptane, 2,2-dimethylbutane and petroleum ether, are preferably used. At the beginning of the reaction, some of the block and/or graft copolymer is present in solution or may be formed in situ in the first 20% of the reaction.

Graft or block copolymers which are suitable according to the invention in step a) are all polymers which have a fraction which is soluble in the dispersant and one which is insoluble therein and thus act as polymer emulsifiers. Polymer particles are formed under the action of these emulsifiers. In particular, the soluble fraction comprises polybutadiene or polyisoprene, which can be completely or partially hydrogenated, while the insoluble fraction comprises polystyrene or substituted polystyrenes, such as poly-$\alpha$-methylstyrene. Particularly preferred graft copolymers are comb polymers of styrene and butadiene. Preferably used block copolymers are styrene/butadiene or styrene/isoprene copolymers which have two or more blocks and which are partially or completely hydrogenated.

Monomers (a) suitable according to the invention are preferably substituted or unsubstituted styrenes, in particular styrene, $\alpha$-methylstyrene, isobutene, substituted or unsubstituted conjugated alkadienes, preferably $C_4$–$C_{10}$-alkadienes, in particular butadiene or isoprene, crosslinking (polyfunctional) monomers, in particular divinyl compounds, such as divinylbenzene, or mixtures thereof. The preferred amount by weight of graft and/or block copolymers is from 0.1 to 50, in particular from 0.1 to 20, in general preferably from 0.1 to 7,% by weight, based in each case on 100% by weight of monomers (a).

The polymerization in step a) is preferably carried out anionically, cationically or in the presence of metallocene catalysts. Suitable processes for carrying out such polymerization reactions are known to a person skilled in the art. Suitable polymerization initiators for anionic polymerization are n-butyllithium, sec-butyllithium and tert-butyllithium, and suitable polymerization initiators for cationic polymerization are boron trifluoride ($BF_3$) with traces of water and aluminum trichloride, and alkyl chlorides. Suitable metallocene catalysts are cyclopentadiene complexes with metals of subgroups III and IV and lanthanoids, which are activated with methylalumoxane, in particular complexes with the metals titanium or zirconium. Ziegler-Natta or group-transfer catalysts, for example titanium trichloride with aluminum alkyls, may also be used. Butyllithium compounds are particularly preferred according to the invention.

The first polymerization step (step a)) can be terminated by adding stopping reagents, such as $CO_2$, $H_2O$, an alcohol, such as methanol, ethanol, isopropanol or butanol, $SO_2$, $SO_3$ or a sulfide, eg. ethylene sulfide. In the case of chemical linking of the polymers from step a) and from step b), it is advantageous to terminate the first polymerization (step a)) by adding ethylene sulfide or to add divinylbenzene at the end of stage a). After step a) has been carried out, a polymer which consists of the polymer from a) which is covered with the block copolymers and/or graft copolymers is obtained.

Polymerization stage b)

According to the invention, at least one monomer (b) is subjected to free radical polymerization in polymerization stage b), in the presence of polymer obtained from polymerization stage a). Shells or interpenetrating networks are formed around the polymer particles from step a).

Monomers which are suitable according to the invention as monomers (b) are all monomers which are capable of free radical polymerization. The monomers stated in the case of the monomers (a) are preferably used, provided that they are capable of free radical polymerization. Acrylonitrile, acrylic acid and its derivatives, such as acrylates where the alkyl group of the ester is of 1 to 30 carbon atoms, eg. methyl acrylate, ethyl acrylate, butyl acrylate, acrylamide and glycidyl acrylate and the same compounds with methacrylic acid, and ethylene, maleimide, maleic anhydride and vinyl chloride are also suitable. In a preferred embodiment of the invention, styrene, butadiene, isoprene, acrylonitrile, acrylic acid and methacrylic acid and the esters, amides and anhydrides thereof, ethylene, maleimide and/or vinyl chloride are used. Further suitable monomers are described, for example, in Polymer Handbook, Brandrup and Immergut, 3rd Edition, published by John Wiley and Sons, pages II/154–II/251. Styrene and acrylonitrile are most preferred.

In the case of sequential addition of different monomers in step b), a shell comprising a plurality of layers may be produced by carrying out a polymerization after each addition of a monomer according to stage b). Preferably, stage b) is carried out only once.

Free radical initiators which are suitable, according to the invention, for carrying out the free radical polymerization of step b) are all compounds which form free radicals thermally or photochemically. Peroxide compounds, such as benzyl peroxide, tert-butyl perpivalate and dicumyl peroxide, and azo compounds, such as azobisisobutyronitrile, are particularly suitable. Peroxide compounds are most preferred.

Processes for carrying out the free radical polymerization in step b) are known to a person skilled in the art. Polymerization stage b) can be carried out in the same solvent (dispersant), as can polymerization stage a), so that it is not necessary to separate off the solvent after the end of step a). Rather, the procedure can be continued directly with the suspension obtained. In addition to the solvents of step a), all other solvents or solvent mixtures in which the polymers from stage b) are insoluble are also suitable. The choice of these solvents depends on the polymer type of stage b).

We have found that the object of the invention is also achieved by the polymer particles described in the claims. These comprise a core which is prepared by polymerization of at least one monomer (a) in the presence of block copolymers or graft copolymers in an organic dispersant which does not dissolve the polymer to be prepared and at least one shell which at least partly surrounds the core and which is prepared by free radical polymerization of at least one monomer (b) in the presence of the core. The preferred polymer particles are the product of the novel process.

The mean particle size (the mean diameter) is typically from 0.1 to 100 μm (determined using a microscope) and depends to a great extent on the amount of block or graft copolymer used. The larger this is, the larger is the amount of polymer emulsifier and, as a rule, the smaller are the particles. The amount of block or graft copolymer is adjusted individually to the intended use.

According to the invention, the polymer particles described above can be used as dulling agents, preferably in thermoplastics or thermosetting plastics. The mean diameter of the polymer particles is preferably more than 5 μm.

Polymer particles as described above can also be used as impact modifiers, particularly if their mean diameter is less than 5 μm.

The Examples which follow and which describe further preferred special features of the invention illustrate the present invention.

EXAMPLES

In all Examples, the polymer particles were measured by microscopy in order to determine the mean particle diameter.

Example 1

Polymerization stage a)

A solution of 819 g of styrene, 0.819 g of divinylbenzene and 114.7 g of a styrene/butadiene two-block copolymer having a molecular weight of about 140000 and a styrene/butadiene ratio of 40:60 was introduced with 1521 g of dry hexane, under a nitrogen atmosphere and with thorough stirring, into a reaction vessel having a volume of 4 l.

Secondary butyllithium was then added until the reaction medium began to assume a yellow color. A further 2.925 ml of secondary butyllithium were then added.

An exothermic reaction took place, the temperature increasing to 64° C.

At this temperature, the mixture was stirred for one hour under a nitrogen atmosphere. Finally, the reaction was stopped with 2 ml of dried ethanol, a suspension being obtained.

Polymerization stage b)

1184 g of the suspension formed in polymerization stage a), 366 g of hexane, 338 g of styrene, 113 g of acrylonitrile and 0.49 g of benzoyl peroxide were introduced, under a nitrogen atmosphere with stirring, into a steel kettle.

The kettle was heated to 86° C. After a polymerization time of 6 hours, the mixture was cooled. The resulting polymer particles were precipitated with 4 l of methanol, washed with methanol and dried at 60° C.

The polymer particles formed had mean diameters of from 0.5 to 2 μm.

Example 2

Example 1 was repeated, with the proviso that 4.095 g of divinylbenzene were used instead of 0.819 g of divinylbenzene.

Particles having a mean diameter of about 10 μm were obtained.

Example 3

Example 1 was carried out, once again with the proviso that 20 g of a hydrogenated styrene/butadiene two-block copolymer having a molecular weight of about 160000 and a styrene/butadiene ratio of 40:60 were used instead of 114.7 g of the styrene/butadiene block copolymer. In addition, 546 g instead of 366 g of hexane were used in the second process stage, so that a final solids content of about 40% by weight, based on the end product, was obtained.

Polymer particles having a mean diameter of 40 μm were obtained.

Example 4

Example 3 was modified in such a way that 112 g of a styrene/butadiene block copolymer having a molecular weight of about 150000 and a styrene/butadiene ratio of 9:91 were used instead of 20 g of a hydrogenated styrene/butadiene two-block copolymer. In addition, 939 g of hexane were added in the second process stage, so that a final solids content of 35% by weight, based on the end product, was achieved.

Polymer particles having a mean diameter of 5 μm were obtained.

Photographs of all polymer particles obtained in Examples 1 to 4 showed many occlusions, which means that the graft shell comprising styrene and acrylonitrile had partially polymerized into the polystyrene phase.

We claim:

1. A process for the preparation of polymer particles, which process comprises the following sequential steps:

a) polymerizing styrene and a crosslinking monomer anionically in a hydrocarbon dispersant which does not dissolve the polymer to be prepared and in the presence of a styrene/butadiene or styrene/isoprene block copolymer or graft copolymer which can be partially or completely hydrogenated, to form a polymer dispersion; and b) polymerizing styrene and acrylonitrile by a free radical mechanism in the presence of the polymer dispersion obtained from step a), the polymerization in step b) being carried out once or several times.

2. A process as defined in claim 1, wherein the crosslinking monomer is divinylbenzene.

3. A process as defined in claim 1, wherein the amount of block copolymer or graft copolymer is from 0.1 to 50% by weight, based on 100% by weight of all monomers in step a).

4. A process as defined in claim 1, wherein a peroxide or azo compound is used for initiating the free radical polymerization of step b).

5. A process as defined in claim 1, wherein the block copolymer or graft copolymer employed is a styrene/butadiene or styrene/isoprene block copolymer or graft copolymer which is partially or completely hydrogenated.

6. Polymer particles prepared by the process of claim 1.

7. Polymer particles according to claim 6, wherein the mean particle size is from 0.1 to 100 $\mu$m.

8. Polymer particles according to claim 7, wherein the mean particle size is from 0.1 to less than 5 $\mu$m.

9. Polymer particles according to claim 7, wherein the mean particle size is from more than 5 to 100 $\mu$m.

10. A method of dulling thermoplastics or thermosetting plastics, which method comprises adding polymer particles as defined in claim 6 to the thermoplastics or thermosetting plastics.

11. A method of impact modifying polymers, which method comprises adding polymer particles as defined in claim 6 to the polymers.

\* \* \* \* \*